United States Patent [19]

Kadowaki et al.

[11] Patent Number: 5,299,292
[45] Date of Patent: Mar. 29, 1994

[54] REDUCTION PRINTING APPARATUS

[75] Inventors: Tango Kadowaki; Hiroyuki Endo, both of Kawasaki, Japan

[73] Assignee: Fujitsu Limited, Kawasaki, Japan

[21] Appl. No.: 894,135

[22] Filed: Jun. 4, 1992

[30] Foreign Application Priority Data

Jun. 4, 1991 [JP] Japan .................................. 3-132535

[51] Int. Cl.⁵ .............................................. G06F 15/00
[52] U.S. Cl. ...................................... 395/108; 382/55
[58] Field of Search ................ 395/101, 102, 108, 109, 395/117, 112, 114; 400/121; 346/154; 358/451, 431, 428; 382/54–55

[56] References Cited

FOREIGN PATENT DOCUMENTS 0331033 9/1989 European Pat. Off. ............. 395/109

Primary Examiner—Arthur G. Evans
Attorney, Agent, or Firm—Staas & Halsey

[57] ABSTRACT

According to the present invention, a reduction printing apparatus includes: an n-line memory unit (1) for storing an object line "n" to be thinned-out in binary images extended on a bit map;

an n−1/n+1-line memory unit (2) for storing the first line "n−1" before the object line "n", or the first line "n+1" after the object line "n", an n-2/n+2-line memory unit (3) for storing the second line "n−21" before the object line "n" or the second line "n+2" after the object line "n"; an output means (1,2,4) for performing an OR logic process between the n-line memory unit (1) and the n−1/n+1-line memory unit (2), and outputting the result to an A-line memory (6); an output means (1,2,5) for performing an AND logic process between the n-line memory unit (1) and the n−1/n+1-line memory unit (2), and outputting the result to a B-line memory (7); and a 2-1-selector (8) selects either the A-line memory (6) or the B-line memory (7) in accordance with the content of the n−2/n+2-line memory unit (3), and outputs the result to a C-line memory (9); wherein when the content of the n=2/n+2-line memory unit (3) is the column for "0", the 2-1-selector (8) selects the content of the A-line memory (6), and when the content of the n−2/n+2-line memory unit (3) is the column for "1", the 2-1-selector (8) selects the content of the B-line memory (7), and the selected contents are output to the C-line memory (9) for printing.

27 Claims, 5 Drawing Sheets

Fig. 1
PRIOR ART

Fig. 2A
PRIOR ART
(SIMPLE THINNED-OUT OPERATION)

Fig. 2B
PRIOR ART
(OR-THINNED-OUT OPERATION)

OUTPUT: LINE ② OF FIG. 5

| CONTENT OF PROCESS | VALUE OF EACH COLUMN A B C D E F G H I J K L M N |
|---|---|
| LINE (n-1) (THIRD LINE IN FIG. 1) | 0 0 0 0 0 0 0 1 1 1 1 1 1 1 |
| OBJECT LINE (n) TO BE THINNED-OUT (FOURTH LINE IN FIG. 1) | 0 0 0 0 0 0 0 1 1 1 1 1 1 1 |
| OR-OPERATION (BY OR-4) FOR A-LINE MEMORY 6, (n-1) OR (n) | 0 0 0 0 0 0 0 1 1 1 1 1 1 1 |
| AND-OPERATION (BY AND-5) FOR B-LINE MEMORY 7, (n-1) AND (n) | 0 0 0 0 0 0 0 1 1 1 1 1 1 1 |
| LINE (n-2) (SECOND LINE IN FIG. 1) | 1 1 1 1 1 1 1 0 0 0 0 0 0 0 |
| OUTPUT TO C-LINE MEMORY 4, WHEN LINE (n-2) IS "0", (n-1) OR (n), WHEN LINE (n-2) IS "1", (n-1) AND (n) | (SECOND LINE OF FIG. 5) 0 0 0 0 0 0 0 1 1 1 1 1 1 1 |

OUTPUT OF B-MEMORY IS SELECTED | OUTPUT OF A-MEMORY IS SELECTED

Fig. 4B

OUTPUT: LINE ③ OF FIG. 5

| CONTENT OF PROCESS | VALUE OF EACH COLUMN A B C D E F G H I J K L M N |
|---|---|
| LINE (n-1) (FIFTH LINE IN FIG. 1) | 1 1 1 1 1 1 1 0 0 0 0 0 0 0 |
| OBJECT LINE (n) TO BE THINNED-OUT (SIXTH LINE IN FIG. 1) | 0 0 0 0 0 0 0 1 1 1 1 1 1 1 |
| OR-OPERATION (BY OR-4) FOR A-LINE MEMORY 6, (n-1) OR (n) | 1 1 1 1 1 1 1 1 1 1 1 1 1 1 |
| AND-OPERATION (BY AND-5) FOR B-LINE MEMORY 7, (n-1) AND (n) | 0 0 0 0 0 0 0 0 0 0 0 0 0 0 |
| LINE (n-2) (FOURTH LINE IN FIG. 1) | 0 0 0 0 0 0 0 1 1 1 1 1 1 1 |
| OUTPUT TO C-LINE MEMORY 4, WHEN LINE (n-2) IS "0", (n-1) OR (n), WHEN LINE (n-2) IS "1", (n-1) AND (n) | (THIRD LINE OF FIG. 5) 1 1 1 1 1 1 1 0 0 0 0 0 0 0 |

OUTPUT OF A-MEMORY 6 IS SELECTED | OUTPUT OF B-MEMORY 7 IS SELECTED

Fig. 5

REDUCTION PRINTING APPARATUS

BACKGROUND OF THE INVENTION

1. Field of the Invention

The present invention relates to a reduction printing apparatus in a desk-publishing system using a personal computer, particularly, it relates to a reduction printing apparatus for binary images extended on a bit-map.

2. Description of the Related Art

Recently, a desk-top-publishing (DTP) system using a personal computer is widely utilized in the newspaper industry for editing and preparing publications using a personal computer. That is, on the display of the personal computer, an editor inputs characters, drafts drawings, edits pages, performs a layout for space, and finally prepares a block copy that is printable.

In such a high-speed DTP system, high-speed peripheral apparatuses are also required. Particularly, an output apparatus that prints the result of the edition is required. Recently, laser printers, which are widely utilized, satisfy the requirements of the DTP system from the view point of high speed and high quality.

For example, in the newspaper industry, to simultaneously publish a newspaper having the same content in central and local districts, one manuscript is simultaneously sent from the central district to the local districts. In this case, there are various output apparatuses each having different resolution in the local districts. For example, the manuscript is sent from the central district to output apparatuses of the local district, for example, laser printers having high resolution (for example, 400 dpi) or facsimile apparatuses having low resolution (for example, 200 dpi).

As a counter-measure for such various output apparatuses each having different resolution, reduced printing is performed by a thinned-out operation for an original image in accordance with the resolution of the output apparatus. In this case, it is important to avoid the deterioration of the quality of the image caused by the thinned-out operation.

SUMMARY OF THE INVENTION

The object of the present invention is to provide a reduction printing apparatus enabling a print of reduced image having improved quality for different resolutions in an output apparatus of a DTP system.

According to the present invention, a reduction printing apparatus includes;

an n-line memory unit (1) for storing an object line "n" to be thinned-out in binary images extended on a bit map, an n−1/n+1-line memory unit (2) for storing the first line "n−1" before the object line "n", or the first line "n+1" after the object line "n", an n−2/n+2-line memory unit (3) for storing the second line "n−21" before the object line "n", or the second line "n+2" after the object line "n", an output means (1,2,4) for performing an OR logic process between the n-line memory unit (1) and the n−1/n+1-line memory unit (2), and outputting the result to an A-line memory (6), an output means (1,2,5) for performing an AND logic process between the n-line memory unit (1) and the n−1/n+1-line memory unit (2), and outputting the result to a B-line memory (7), and a 2-1-selector (8) selects either the A-line memory (6) or the B-line memory (7) in accordance with the content of the n−2/n+2-line memory unit (3), and outputs the result to a C-line memory (9), wherein when the content of the n−2/n+2-line memory unit (3) is the column for "0", the 2-1-selector (8) selects the content of the A-line memory (6), and when the content of the n−2/n+2-line memory unit (3) is the column for "1", the 2-1-selector (8) selects the content of the B-line memory (7), these selected contents are output to the C-line memory (9) for a print.

DESCRIPTION OF THE PREFERRED EMBODIMENTS

Before explaining an embodiment of the present invention, a conventional printing method and its problem will be explained below.

Figure 1:
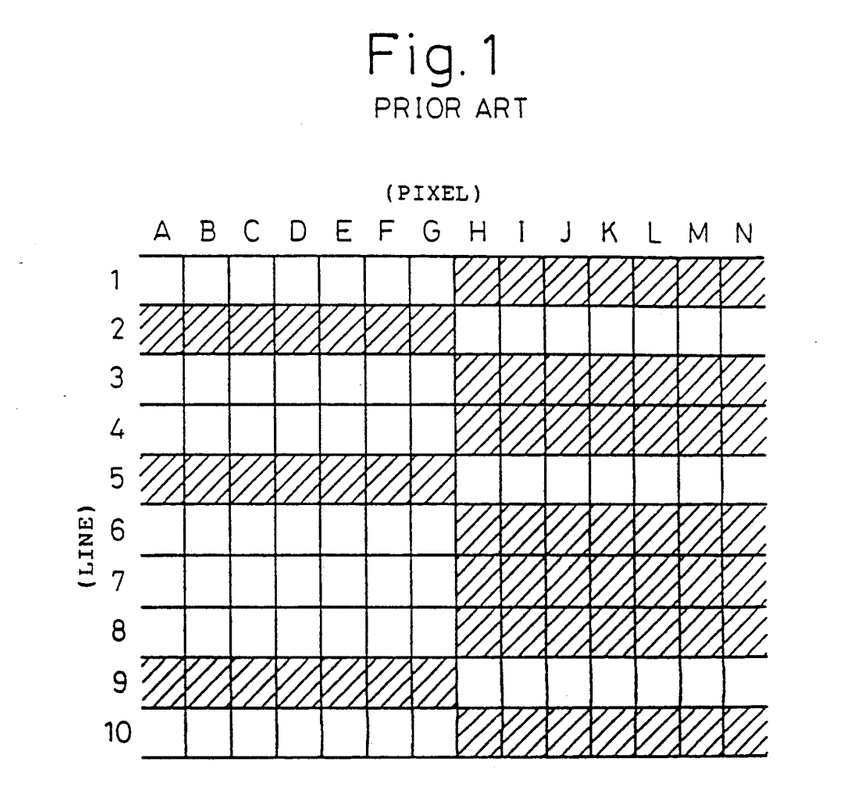
FIG. 1 is a view explaining one example of a conventional reduction printing method.
Figure 2A:
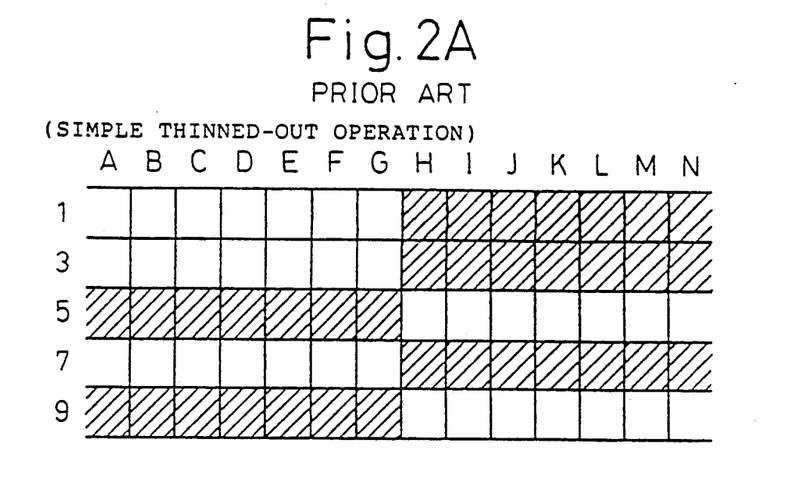
FIGS. 2A and 2B are views explaining another example of a conventional reduction printing method.
Figure 2B:
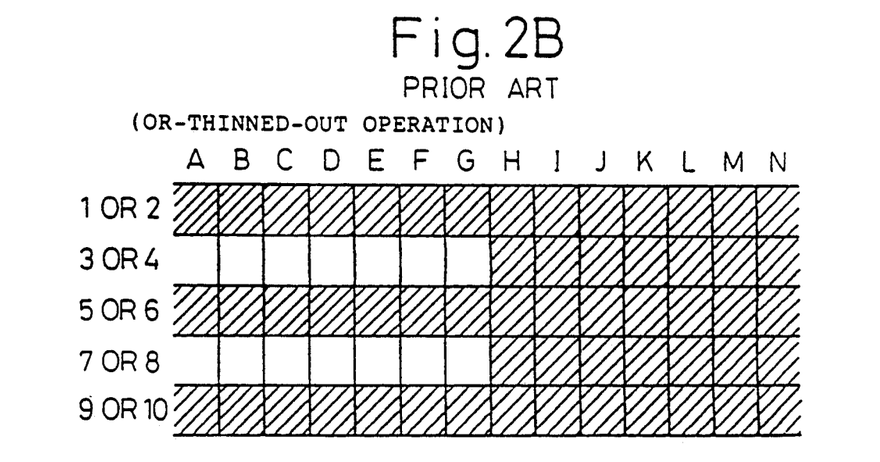

FIG. 1 is a view explaining one example of a conventional reduction printing method, and FIGS. 2A and 2B are views explaining another example of a conventional reduction printing method. FIG. 1 shows one example of an original image to be sent, FIGS. 2A shows one example of an image reduced by a simple thinned-out operation, and FIG. 2B shows one example of an image reduced by the thinned-out operation by a logical sum (below, an OR-thinned-out operation). In these drawings, A to N denote pixels each corresponding to a pixel (i.e., column), and 1 to 10 denote lines, which are elements on the bit map.

In a conventional reduction printing method, a concrete thinned-out circuit will be omitted. In the simple thinned-out operation for the original image in FIG. 1, when this thinned-out operation is performed for even lines as an object to be thinned-out, the image having a drop-out of lines is output as shown by the white area in FIG. 2A. Accordingly, in such a simple thinned-out operation, when one black line and one white line are the object to be thinned-out, these lines are dropped out from the image so that there is the problem that the quality of the image deteriorates.

Recently, the OR-thinned-out operation as shown in FIG. 2B has been proposed as a method to solve the above problem. According to this method, it is possible to output the image compensating the black line between the white lines.

In the case of the OR-thinned out operation, however, when one white line becomes the object to be thinned-out, there is the problem that said white line is dropped from the image.

That is, for the original image shown in FIG. 1, when the thinned-out operation is performed for even lines as the object to be thinned-out, as shown in FIG. 2B, the white lines 2, 5 and 9 between the black lines for the columns H to N are thinned-out so that there is the problem that said lines are dropped in the reduced image.

In the present invention, to solve the above problem, first, a candidature line to be thinned-out is obtained based on the object line "n" and the fist line "n−1∞ before the object line "n". Next, the candidature is selected based on information regarding the white/black line for the second line "n−2" before the object line "n".

When the one black line exists between the white lines, or when the one white line exists between the black lines, the original images can be reduced so as not to cause the one black line or one white line to drop out so that it is possible to provide a reduction printing apparatus that improves the quality of the image for the output apparatuses even if each have a different resolution.

Figure 3:
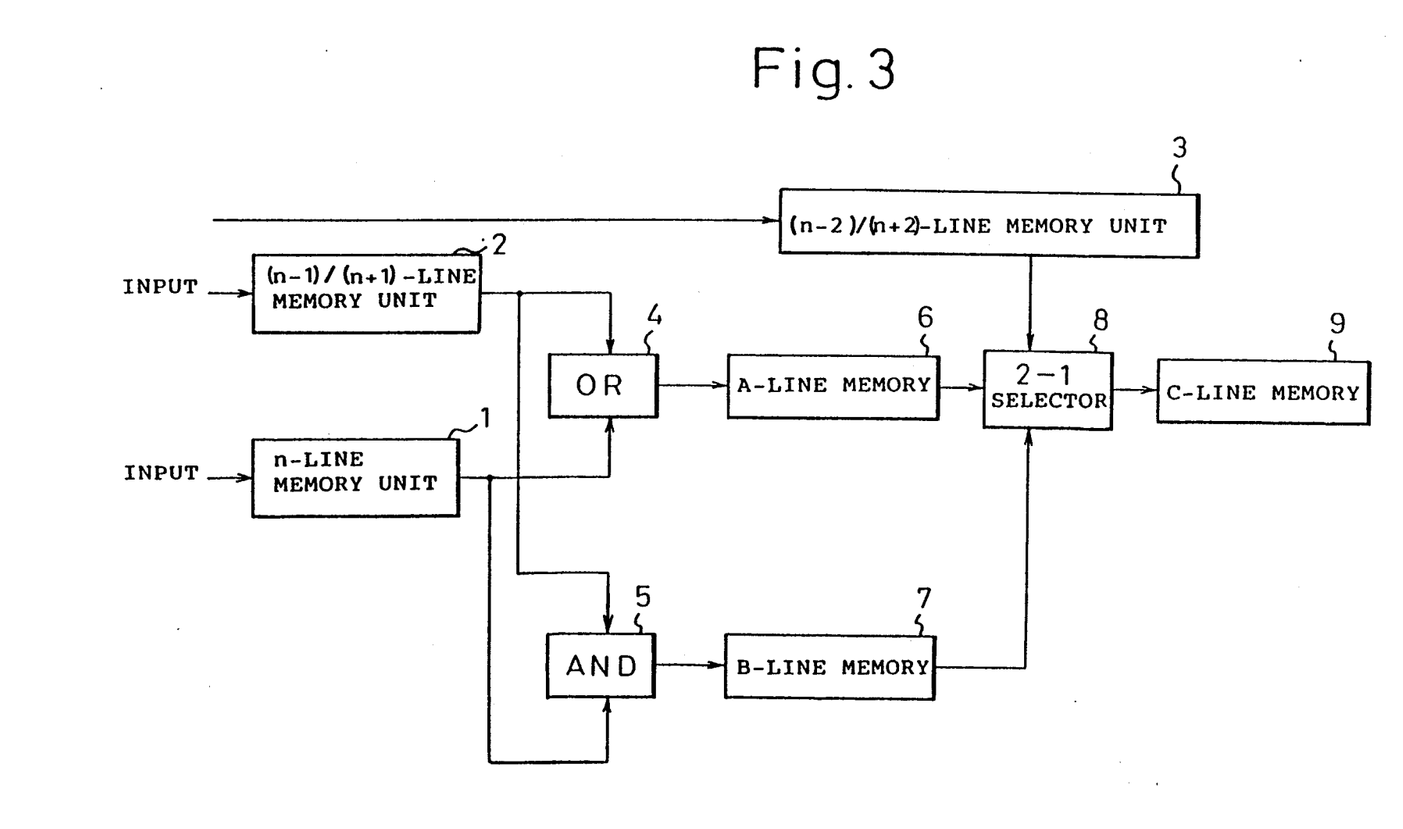
FIG. 3 is basic structural diagram of a reduction printing apparatus according to the present invention.

FIG. 3 is a basic structural diagram of a reduction printing apparatus according to the present invention. In the drawing, reference number 1 denotes an n-line memory unit, 2 denotes an n−1-line memory unit, 3 denotes an n−2-line memory unit, 4 denotes an OR gate, 5 denotes an AND gate, 6 denotes an A-line memory, 7 denotes a B-line memory, 8 denotes 2-1-selector, and 9 denotes a C-line memory.

According to the present invention, the n-line memory unit 1 stores the object line "n" to be thinned-out in the binary image extended on the bit-map. The n−1/n+1-line memory unit 2 stores the first line "n−1" before the object line "n" or the first line "n+1" after the object line "n" to be thinned-out. The n−2/n+2-line memory unit 3 stores the second line "n−2" before the object line "n" or the second line "n+2" after the object line "n" to be thinned-out.

Further, the OR gate 4 performs the OR logic operation for the n-line memory unit 1 and the n−1/n+1-line memory unit 2, and outputs the result to the A-line memory 6. The AND gate 5 performs the AND logic operation for the n-line memory unit 1 and the n−1/n+1-line memory unit 2, and outputs the result to the B-line memory 7. The 2-1-selector 8 selects either the A-line memory 6 or the B-line memory 7 in accordance with the content of the n−2/n+2-line memory unit 3, and outputs the result to the C-line memory 9.

When the content of the n−2/n+2-line memory unit 3 is the column for "0", the content of the A-line memory 6 is selected. When the content of the n−2/n+2-line memory unit 3 is the column for "1", the content of the B-line memory 7 is selected. These contents are output to the C-line memory 9 for printing.

As explained above, in the present invention, the black line between the white line is compensated for by the OR logic operation, and the white line between the black lines is compensated for by the AND logic operation. Accordingly, in the present invention, the result for the OR logic operation between the object line "n" to be thinned-out and the fist line "n−1" before the object line "n" can be obtained, and the result for the AND operation between the object line "n" to be thinned-out and the first line "n−1" before the object line "n" can be obtained. The result of the OR logic operation is stored in the A-line memory 6, and the result of the AND operation is stored in the B-line memory 7.

The 2-1-selector selects either the content of the A-line memory 6 or the B-line memory 7 in accordance with the black/white lines for the second line "n−2" before the object line "n". For example, when the column of the second line "n−2" before the object line "n" is white "0", the content of the A-line memory 6, which is compensated for by the black line, is output. When the column of the second line "n−2", before the object line is white "1", the content of the B-line memory, which is compensated for by the white line, is output. Accordingly, it is possible to avoid a drop-out of the one black line or the one white line.

Accordingly, assuming that the one black line exists between the white lines, or the one white line exists between the black lines, when the thinned-out operation is performed for the optional one line "n" which is previously determined, the three lines (n,n−1,n−2) before the object line "n" are referred to so that it is possible to avoid a drop-out of the white/black line.

Figure 4A:
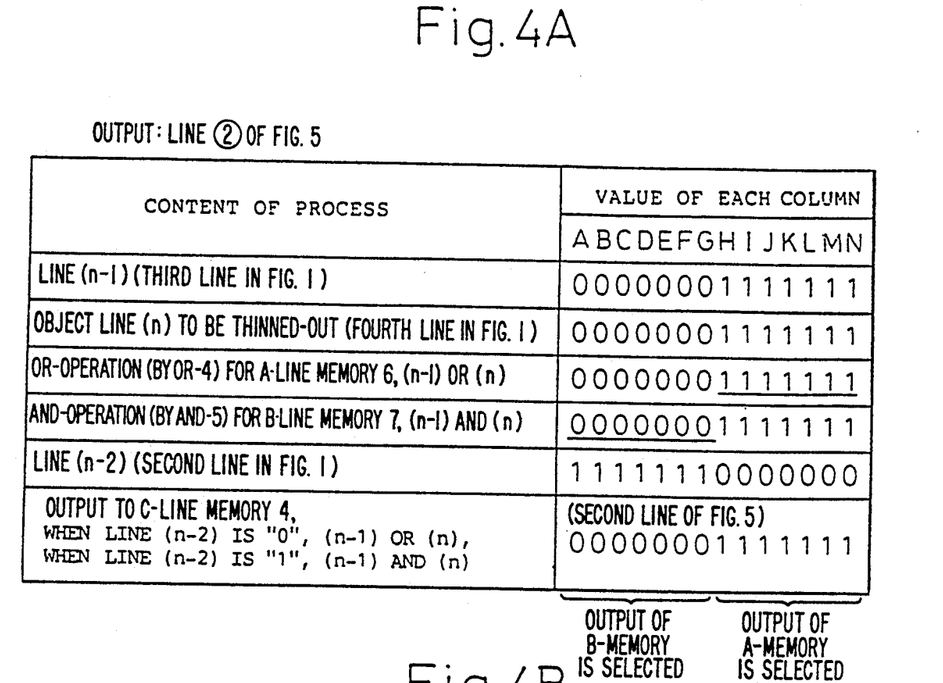
FIGS. 4A and 4B are views explaining the relationship between pixels and lines according to one embodiment of the present invention.
Figure 4B:
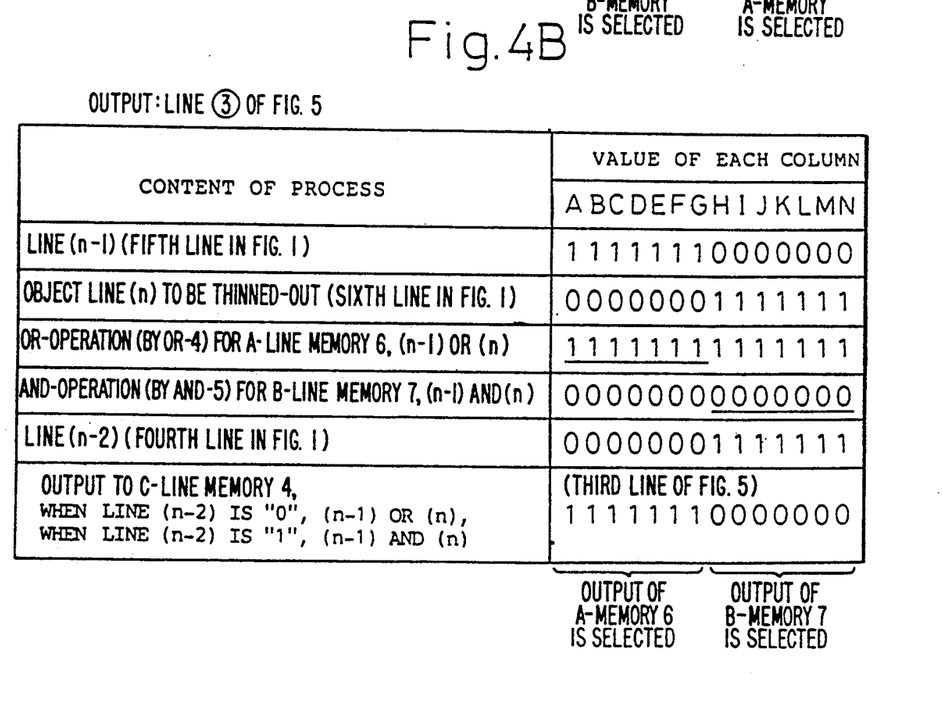
Figure 5:
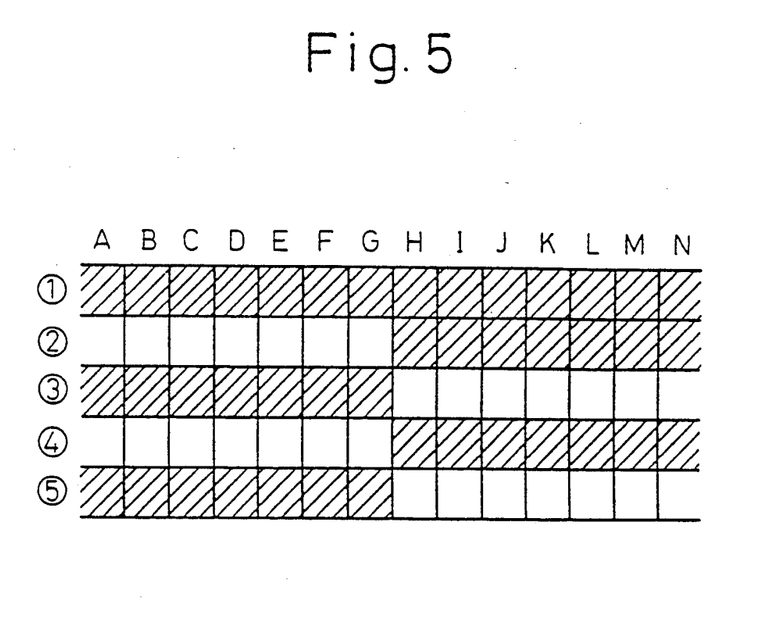
FIG. 5 is an essential view explaining the relationship between pixels and lines according to one embodiment of the present invention.

FIGS. 4A and 4B are views explaining the relationship between pixels and lines according to one embodiment of the present invention, and FIG. 5 is an essential view explaining the relationship between pixels and lines according to one embodiment of the present invention. First, the object image to be reduced is input from the bit map to the line memory units. The object line "n" to be thinned-out, for example, the even line, is obtained. In this case, the object line "n" is stored in the n-line memory unit 1, and the second line "n−2" before the object line "n" is stored in the n−2-line memory unit 3.

Further, the data stored in the n-line memory unit1 and the n−1-line memory unit 2 are processed by the OR logic and the AND logic in the OR processing unit 4 and the AND processing unit 5 for every pixel (column), and the resultant data are stored in the A-line memory 6 and the B-line memory 7.

The data stored in the n-2-line memory unit 3, the A-line memory, and the B-line memory are sent to the 2-1-selector 8 for every pixel. In the selector 8, when the pixel (column) value of the n−2-line memory unit 3 is "0", the output of the A-line memory 6, which compensates for the black line (the pixel value is "1"), is selected by the selector B. When the pixel value of the n−2-line memory unit 3 is "1", the output of the B-line memory 7, which compensates the white line (the pixel value is "1"), is selected by the selector 8. The selected value is output to the C-line memory so that it is possible to avoid the drop-out of the one black line and the one white line.

FIG. 4A shows one example of a thinned-out operation. When the fourth line (00000001111111) is the object line to be thinned-out for the original image data shown in FIG. 1, the output of the second line (00000001111111) is generated for the reduced image.

FIG. 4B shows another example of the thinned-out operation. When the sixth line (00000001111111) is the object line to be thinned-out for the original image data shown in FIG. 1, the output of the third line (11111110000000) is generated for the reduced image.

FIG. 5 shows the output lines 1 to 5 when the above process is performed for the object lines (n=2,4,6,8 and 10) to be thinned-out. Obtaining a reduced image without a drop-out of the one black line or the one white line for the original image.

When the object line to be thinned-out is "2" (i.e., n=2), the second line "n−2" before the object line "n" is not dependent on the original image. Accordingly, when the initial value "0" is set to the n−2-line memory unit 3, at which the data for the second line "n−2" before the object line, is stored, the value "1" is easily output as the output data. When the initial value "1" is set to the n−2-line memory unit 3, which the data for the second line "n−2" before the object line "n", is stored, the value "0" is easily output as the output data.

In line 1 shown in FIG. 5, as one example of the reduced image, when the thinned-out operation for the second line is performed for the original image as shown in FIG. 1, all "0" are set to the n−2-line memory unit 3. This can be easily understood from the process examples shown in FIGS. 4 and 5.

In the above embodiment, the explanation is prepared for the object line to be thinned-out for the original image regarding the first line "n−1" and the second line "n−2" before the object line "n". Further, it is possible to easily perform the thinned-out operation regarding the first line "n+1" and the second line "n+2" after the object line "n".

The reduction printing apparatus according to the present invention can obtain a high quality image in the output apparatus each having a different resolution in a desk-top-system using a computer. Accordingly, it is possible to utilize the high quality image transmission.

We claim:

1. An apparatus for reducing the data content of an original image, represented in a binary bit map comprising a plurality of pixels arranged in plural, parallel lines, each line comprising a common number of pixels and the respective pixels of the plural lines being aligned in corresponding columns, oriented substantially transversely with respect to the plural lines, each pixel having a binary bit value of either "1" or "0" in accordance with the original image, the apparatus reducing the data content of the binary bit map relatively to at least one line of pixels, selected as an object line, of the plural lines of pixels of the binary bit map and comprising:

a first selector which selects, from the binary bit map of an original image, at least one object line and first and second lines of binary bit value pixel data which are respectively and successively next adjacent the selected object line in the binary bit map of the original image;

first, second and third memories which respectively store the corresponding binary bit value pixel data of the selected object line and the first and second next adjacent lines of the binary bit map of the original image;

an OR logic circuit, connected to the first and second memories, which performs an OR logic process on the respective binary bit values of the corresponding pixels of the object and first displaced lines of binary bit value pixel data and produces a corresponding, OR-processed line of binary bit values as the output thereof;

an AND logic circuit, connected to the first and second memories, which performs and AND logic process on the respective binary bit values of the corresponding pixels of the object and first displaced lines of binary bit value pixel data and produces a corresponding, AND-processed line of binary bit values as the output thereof;

fourth and fifth memories, respectively connected to the OR logic circuit and the AND logic circuit, which store the respective OR-processed and AND-processed lines of binary bit values output thereby;

a second selector, connected to the third memory, which, in response to the binary bit values of the plural pixels of the line of binary bit value pixel data stored therein, selects the binary bit value of the corresponding pixel of one of the OR-processed line and of the AND-processed line, as stored in the respective corresponding fourth and fifth memories, for each of the common number of plural pixels and produces, as an output, a resultant line of binary bit value pixel print data, the second selector responding to a "0" binary value of a pixel, in the line of binary bit value pixels stored in the third memory, to select the binary bit value of the corresponding pixel of the line of binary bit value pixels stored in the fourth memory as the bit value of the corresponding pixel in the resultant line of binary bit value pixel data and responding to a "1" binary value of a pixel, in the line of binary bit value pixels stored in the third memory, to select the binary bit value of the corresponding pixel of the line of binary bit value pixels stored in the fifth memory as the bit value of the corresponding pixel in the resultant line of binary bit value pixels; and a sixth memory connected to the second selector for storing the resulting line of binary bit value pixels output by the second selector.

2. An apparatus as recited in claim 1, wherein:

the binary bit map of the original image comprises an ordered sequence of N parallel lines of binary bit value pixels;

the at least one selected object line is designated "n", where "n" is a whole number integer between "1" and "N"; and the first selector selects the first and second lines of binary bit value pixels of the binary bit map of the original image which next precede the selected object line "n".

3. An apparatus as recited in claim 2 wherein, when the first selector selects n=2 as the object line, the first selector further selects a common binary bit value for all of the binary bit value pixels stored in the third memory.

4. An apparatus as recited in claim 3, wherein the first selector selects, as plural object lines, an alternating succession of the ordered sequence of lines from 1 to N of the binary bit map of the original image.

5. An apparatus as recited in claim 4, wherein the first selector selects, as the plural object lines, the even-numbered lines from 1 to N.

6. An apparatus as recited in claim 1, wherein:

the binary bit map of the original image comprises an ordered sequence of N parallel lines of binary bit value pixels;

the at least one selected object line is designated "n", where "n" is a whole number integer between "1" and "N"; and the first selector selects the first and second lines of binary bit value pixels of the binary bit map of the original image which next follow the selected object line "n".

7. An apparatus as recited in claim 6 wherein, when the first selector selects n=N−1 as the object line, the first selector further selects a common binary bit value for all of the binary bit value pixels stored in the third memory.

8. An apparatus as recited in claim 7, wherein the first selector selects, as plural object lines, an alternating succession of the ordered sequence of lines from 1 to N of the binary bit map of the original image.

9. An apparatus as recited in claim 8, wherein the first selector selects, as the plural object lines, the even-numbered lines from 1 to N.

10. An apparatus for reducing the data content of an original image, represented in a binary bit map comprising a plurality of pixels arranged in N parallel lines, each line comprising a common number of pixels and the respective pixels of the plural lines being aligned in corresponding columns, oriented substantially transversely with respect to the plural lines, each pixel having a binary bit value of either "1" or "0" in accordance with the original image, the apparatus reducing the data content of the binary bit map relatively to at least one line of pixels, selected as an object line n, of the plural lines of pixels of the binary bit map and comprising:

a first selector which selects, from the binary bit map of an original image, at least one object line n and first and second lines of binary bit value pixel data which are respectively and successively next adjacent the selected object line n in the binary bit map of the original image;

first, second and third memories which respectively store the corresponding binary bit value pixel data of the selected object line n and the first $n-1/n+1$ and second $n-2/n+2$ next adjacent lines of the binary bit map of the original image;

an OR logic circuit, connected to the first and second memories, which performs an OR logic process on the respective binary bit values of the corresponding pixels of the object line n and the first displaced line $n-1/n+1$ of binary bit value pixel data and produces a corresponding, OR-processed line of binary bit values as the output thereof;

an AND logic circuit, connected to the first and second memories, which performs an AND logic process on the respective binary bit values of the corresponding pixels of the object line n and the first displaced line $n-1/n+1$ of binary bit value pixel data and produces a corresponding, AND-processed line of binary bit values as the output thereof;

fourth and fifth memories, respectively connected to the OR logic circuit and the AND logic circuit, which store the respective OR-processed and AND-processed lines of binary bit values output thereby;

a second selector, connected to the third memory, which, in response to the binary bit values of the plural pixels of the line of the binary bit value pixel data $n-2/n+2$ stored therein, selects the binary bit value of the corresponding pixel of one of the OR-processed line and of the AND-processed line, as stored in the respectively corresponding fourth and fifth memories, for each of the common number of plural pixels and produces, as an output, a resultant line of binary bit value pixel print data, the second selector responding to a "0" binary value of a pixel in the line of binary bit value pixels $n-2/n+2$ stored in the third memory, to select the binary bit value of the corresponding pixel of the line of binary bit value pixels stored in the fourth memory as the bit value of the corresponding pixel in the resultant line of binary bit value pixel data and responding to a "1" binary value of a pixel, in the line of binary bit value pixels $n-2/n+2$ stored in the third memory, to select the binary bit value of the corresponding pixel of the line of binary bit value pixels stored in the fifth memory as the bit value of the corresponding pixel in the resultant line of binary bit value pixels; and a sixth memory connected to the second selector for storing the resulting line of binary bit value pixels output by the second selector.

11. An apparatus as recited in claim 10, wherein:
the binary bit map of the original image comprises an ordered sequence of N parallel lines of binary bit value pixels; and
the first selector selects, as the first and second lines of binary bit value pixels of the binary bit map of the original image, the respective lines $n-1$ and $n-2$ which next precede the selected object line "n".

12. An apparatus as recited in claim 11 wherein, when the first selector selects $n=2$ as the object line, the first selector further selects a common binary bit value for all of the binary bit value pixels of the line $n-2$ which is stored in the third memory.

13. An apparatus as recited in claim 12, wherein the first selector selects plural object lines n and has values in an alternating succession of the ordered sequence from 1 to N object lines wherein n has plural values.

14. An apparatus as recited in claim 13, wherein the first selector selects, as the plural object lines, the even-numbered lines from 1 to N.

15. An apparatus as recited in claim 10, wherein:
the binary bit map of the original image comprises an ordered sequence of N parallel lines of binary bit value pixels;
the at least one selected object line is designated "n", where "n" is a whole number integer between "1" and "N"; and
the first selector selects the first and second lines of binary bit value pixels of the binary bit map of the original image which next follow the selected object line "n".

16. An apparatus as recited in claim 15 wherein, when the first selector selects $n=N-1$ as the object line, the first selector further selects a common binary bit value for all of the binary bit value pixels stored in the third memory.

17. An apparatus as recited in claim 16, wherein the first selector selects, as plural object lines, an alternating succession of the ordered sequence of lines from 1 to N of the binary bit map of the original image.

18. An apparatus as recited in claim 17, wherein the first selector selects, as the plural object lines, the even-numbered lines from 1 to N.

19. A method for reducing the data content of an original image, represented in a binary bit map comprising a plurality of pixels arranged in plural, parallel lines, each line comprising a common number of pixels and the respective pixels of the plural lines being aligned in corresponding columns, oriented substantially transversely with respect to the plural lines, each pixel having a binary bit value of either "1" or "0" in accordance with the original image, the method reducing the data content of the binary bit map relatively to at least one line of pixels, selected as an object line, of the plural lines of pixels of the binary bit map and comprising:

as a first selecting step, selecting, from the binary bit map of an original image, at least one object line and first and second lines of binary bit value pixel data which are respectively and successively next adjacent the selected object line in the binary bit map of the original image;

storing each of the corresponding binary bit value pixel data of the selected object line and the first and second next adjacent lines of the binary bit map of the original image;

performing an OR logic process on the respective binary bit values of the corresponding pixels of the selected and stored object and first displaced lines of binary bit value pixel data and producing and storing a corresponding, OR-processed line of binary bit values;

performing an AND logic process on the respective binary bit values of the corresponding pixels of the selected and stored object and first displaced lines of binary bit value pixel data and producing and storing a corresponding, AND-processed line of binary bit values as the output thereof;

in response to the binary bit values of the plural pixels of the selected and stored, second next adjacent line of binary bit value pixel data and as a second selecting step, selecting the binary bit value of the corresponding pixel of one of the stored OR-processed line and of the stored AND-processed line for each of the common number of plural pixels and producing, as an output, a resultant line of binary bit value pixel print data, including responding to a "0" binary value of a pixel, in the selected and stored, second next adjacent line of binary bit value pixels, for selecting the binary bit value of the corresponding pixel of the stored, OR-processed line of binary bit value pixels as the bit value of the corresponding pixel in the resultant line of binary bit value pixel data and responding to a "1" binary value of a pixel, in the selected and stored, second next adjacent line of binary bit value pixels, for selecting the binary bit value of the corresponding pixel of the stored, AND-processed line of binary bit value pixels as the bit value of the corresponding pixel in the resultant line of binary bit value pixels; and printing a reduced data content image, corresponding to the original image, in accordance with the resulting line of binary bit value pixels.

20. A method as recited in claim 19, wherein:

the binary bit map of the original image comprises an ordered sequence of N parallel lines of binary bit value pixels;

the at least one selected object line is designated "n", wherein "n" is a whole number integer between "1" and "N"; and the first selecting step further comprises selecting the first and second lines of binary bit value pixels of the binary bit map of the original image which next precede the selected object line "n".

21. An apparatus as recited in claim 20 wherein, when selecting n=2 as the object line, the first selecting step further comprises selecting a common binary bit value for all of the binary bit value pixels stored in the third memory.

22. A method as recited in claim 21 wherein the first selecting step further comprises selecting, as plural object lines, an alternating succession of the ordered sequence of lines from 1 to N of the binary bit map of the original image.

23. A method as recited in claim 22, wherein the first selecting step further comprises selecting, as the plural object lines, the even-numbered lines from 1 to N.

24. A method as recited in claim 19, wherein:

the binary bit map of the original image comprises an ordered sequence of N parallel lines of binary bit value pixels;

the at least one selected object line is designated "n", where "n" is a whole number integer between "1" and "N"; and the first selecting step further comprises selecting the first and second lines of binary bit value pixels of the binary bit map of the original image which next follow the selected object line "n".

25. A method as recited in claim 24 wherein, when the first selecting step selects n=N−1 as the object line, the first selecting step further comprises selecting a common binary bit value for all of the binary bit value pixels of the second next adjacent line.

26. A method as recited in claim 25, wherein the first selecting step further comprises selecting, as plural object lines, in an alternating succession of the ordered sequence of lines from 1 to N of the binary bit map of the original image.

27. A method as recited in claim 26, wherein the first selecting step further comprises selecting, as the plural object lines, the even-numbered lines from 1 to N.

* * * * *

UNITED STATES PATENT AND TRADEMARK OFFICE
CERTIFICATE OF CORRECTION

PATENT NO. : 5,299,292
DATED : March 29, 1994
INVENTOR(S) : KADOWAKI et al.

It is certified that error appears in the above-indentified patent and that said Letters Patent is hereby corrected as shown below:

Claim 1,    col. 5, line 54, change "and AND" to --an AND--;
             col. 6, line 3, change "respective" to --respectively--.

Claim 10,   col. 7, line 56, after "pixel" insert --,--.

Signed and Sealed this

Eleventh Day of April, 1995

Attest:

BRUCE LEHMAN

Attesting Officer         *Commissioner of Patents and Trademarks*

UNITED STATES PATENT AND TRADEMARK OFFICE
CERTIFICATE OF CORRECTION

PATENT NO. : 5,299,292
DATED : March 29, 1994
INVENTOR(S) : KADOWAKI et al.

It is certified that error appears in the above-indentified patent and that said Letters Patent is hereby corrected as shown below:

Column 2,
TITLE PAGE: [57] ABSTRACT, line 8, change "n-21" to --n-2--.

Signed and Sealed this

Seventh Day of May, 1996

Attest:

BRUCE LEHMAN

Attesting Officer        Commissioner of Patents and Trademarks